United States Patent

Yamamoto et al.

[11] 4,014,414
[45] Mar. 29, 1977

[54] POWER PARKING FAILSAFE DISC BRAKE

[76] Inventors: Mayjue A. Yamamoto, 3235 N. "F" St., San Bernardino, Calif. 92405; Daniel G. Durfee, 5051 Crescent St., San Bernardino, Calif. 92407

[22] Filed: July 7, 1975

[21] Appl. No.: 593,770

[52] U.S. Cl. .................... 188/170; 92/18; 92/23; 92/63; 92/130 A; 192/91 R; 303/6 M
[51] Int. Cl.² ...................................... F16D 65/20
[58] Field of Search .......... 188/721, 170; 303/6 M; 192/91 R, 91 A; 92/18, 20, 23, 24, 27, 28, 63, 64, 130 A

[56] References Cited

UNITED STATES PATENTS

| 1,213,363 | 1/1917 | Henry | 92/18 |
|---|---|---|---|
| 3,182,566 | 5/1965 | Berg et al. | 92/24 |
| 3,422,807 | 1/1969 | Waldecker | 92/23 X |
| 3,633,715 | 1/1972 | Burnett | 188/170 |

FOREIGN PATENTS OR APPLICATIONS

| 1,354,631 | 5/1974 | United Kingdom | 188/170 |

*Primary Examiner*—George E. A. Halvosa
*Attorney, Agent, or Firm*—Herbert E. Kidder

[57] ABSTRACT

A disc brake comprising a caliper housing having axially aligned first and second cylinder bores; a first piston slidable within the first bore and bearing against one of the friction pads; and a second piston slidable within the second bore and having an internally threaded tubular opening into which a clearance adjuster is screwed. The threads of the adjuster are power transmission threads with a helix angle of about 15 degrees, and there is end-wise clearance between the threads sufficient to allow the first piston to move between its retracted and brakes-applied positions. At the end of the adjuster is a head having a conical clutch facing that engages a corresponding conical seat in the bottom of the first piston, so as to exert a powerful rotational clutch action. A spring urges the adjuster toward the bottom of the first piston, and causes the adjuster to unscrew and extent itself whenever there is any clearance between the clutch facing and seat. The second piston has a plurality of belleville springs bearing against its back side, and when hydraulic pressure is admitted to the two cylinders, the first piston applies the brakes, and the second piston compresses the springs and is then locked in place by a solenoid-operated detent. The solenoid can be de-energized to allow disengagement of the detent and release of the second piston so that the compressed springs can urge the piston in the direction to apply the brakes. The solenoid may be actuated by means of a manually controlled switch, or by operation of a switch in the differential pressure valve due to a failure to one of the hydraulic pressure lines. A second solenoid may be provided to effect partial application of the brakes on a long, downhill grade.

7 Claims, 4 Drawing Figures

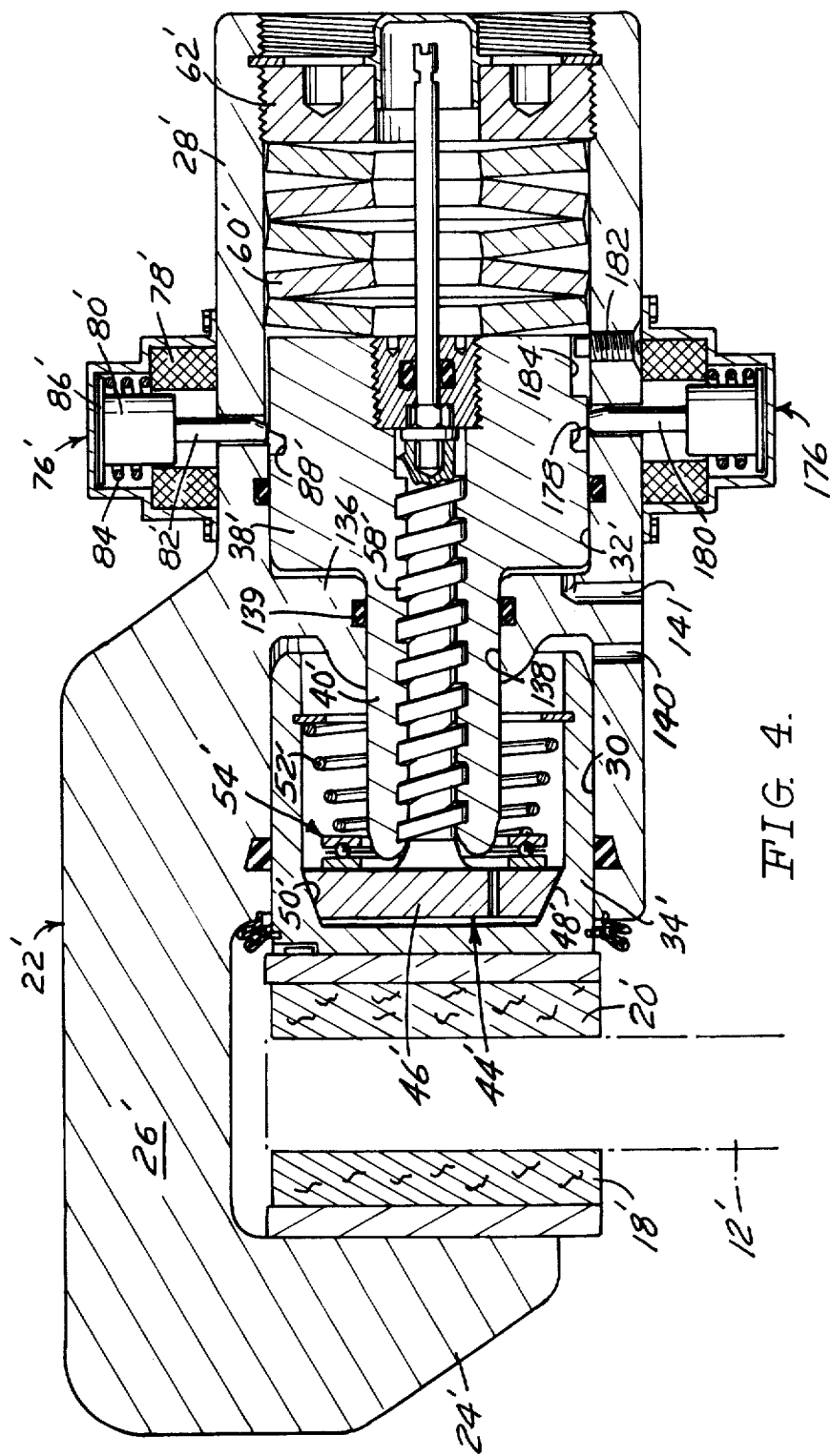

POWER PARKING FAILSAFE DISC BRAKE

BACKGROUND OF THE INVENTION

The present invention pertains generally to disc brakes for automotive use, and more particularly to a new and improved power-operated, failsafe braking system.

Heretofore, hydraulically operated disc brakes have been restricted to normal service operation, in which the operator applies the brake by applying foot pressure to a brake pedal. For parking or emergency brake purposes, an entirely separate brake is generally used, which may consist of either a disc brake or a drum brake mounted on the drive shaft or on the wheel axles. The provision of separate parking brake units adds to the vehicle cost and maintenance, and such independent brake systems frequently deteriorate if not used regularly, as in flat country where drivers commonly use the transmission pawl as a parking brake. Rust and dirt accumulate on the linings and prevent the brakes from functioning properly when needed to park on a slope or in an emergency.

SUMMARY OF THE INVENTION

The primary object of the present invention is to provide a new and improved disc brake which combines hydraulic operation for normal braking services, with power-operated parking brakes.

Another important object of the invention is to provide a hydraulically operated disc brake having a failsafe feature whereby the brakes on all four wheels are automatically applied if there is a brake line failure in either pair of interconnected brakes. It is customary in present-day cars to connect the brakes in pairs which are served by separate hydraulic lines connected to a pressure differential valve, so that if one pair of brakes should fail, the other pair will still be operative and will enable the driver to bring the car to a controlled stop. With the present invention, the disc brake is automatically actuated by any failure or loss of pressure in the hydraulic system, thereby bringing the car to a safe and controlled stop.

A further object of the invention is to provide a new and improved adjustment system for taking up wear in the brake pads, so that there is always a constant, small amount of operational movement required to apply the brakes, particularly when the brakes are being applied by the spring system.

Still another object of the invention is to provide a disc brake wherein hydraulic pressure is used for service operation of the brakes, and spring power is alternatively available to operate the brakes, either for emergency and parking purposes, or as a retarder brake on long downhill grades, as in the case of trucks. One highly advantageous feature of the invention is that the spring pressure can be increased, if desired, while the brakes are being applied on a downhill grade.

These and other objects and advantages of the invention will become apparent to those skilled in the art from the following detailed description of the preferred embodiments thereof, with reference to the accompanying drawings.

BRIEF DESCRIPTION OF THE DRAWINGS

FIG. 4 is a cross-sectional view of another embodiment of the invention.

DESCRIPTION OF THE PREFERRED EMBODIMENTS

Figure 1:
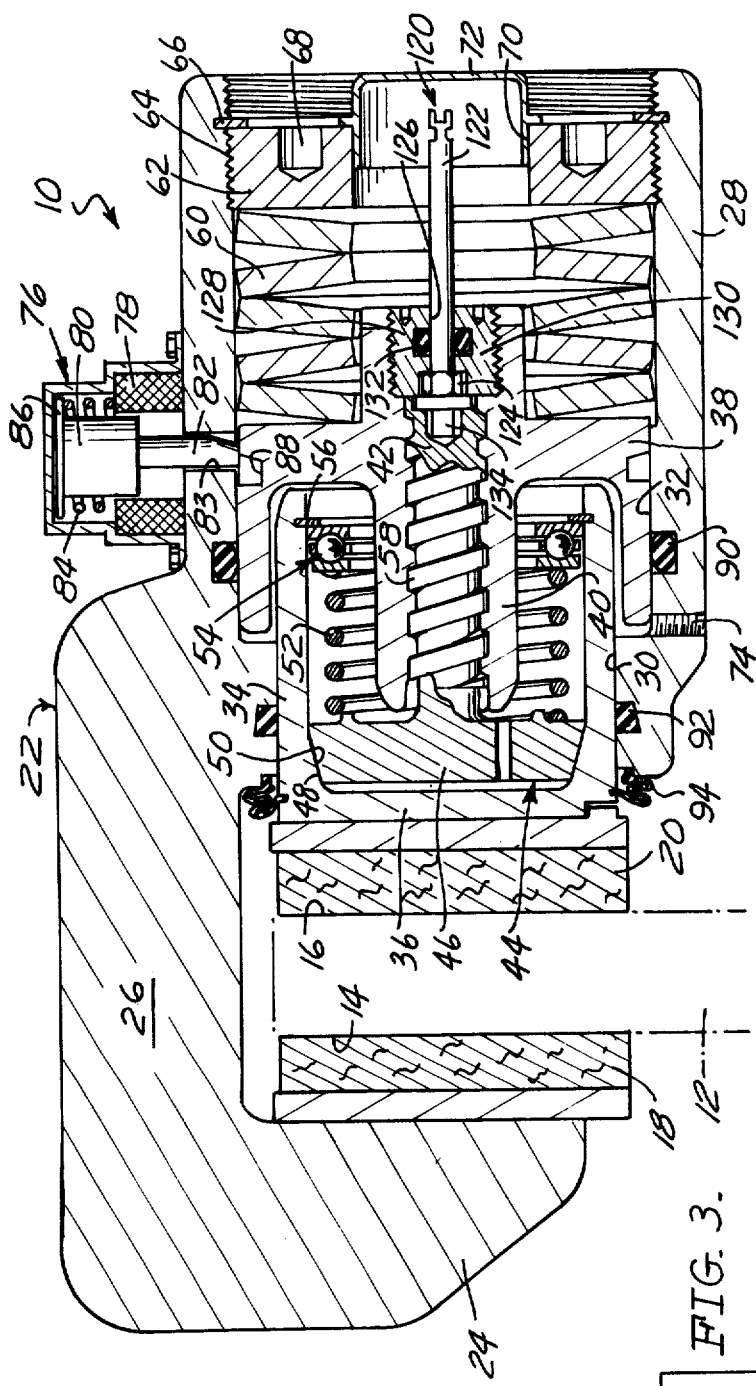
FIG. 1 is a cross-sectional view of a disc brake embodying the principles of the present invention.
Figure 2:
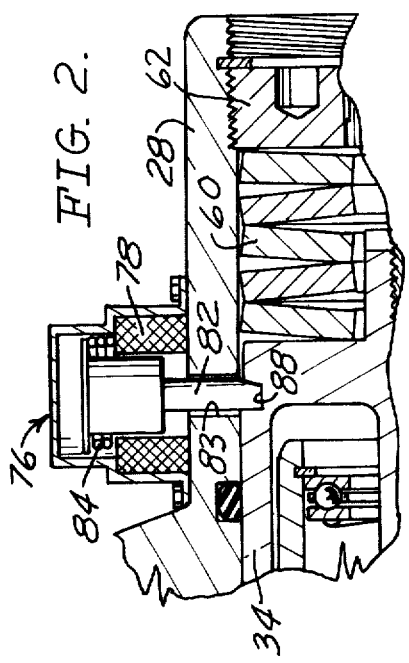
FIG. 2 is a fragmentary sectional view of the same, showing the locking detent in the engaged position.
Figure 3:
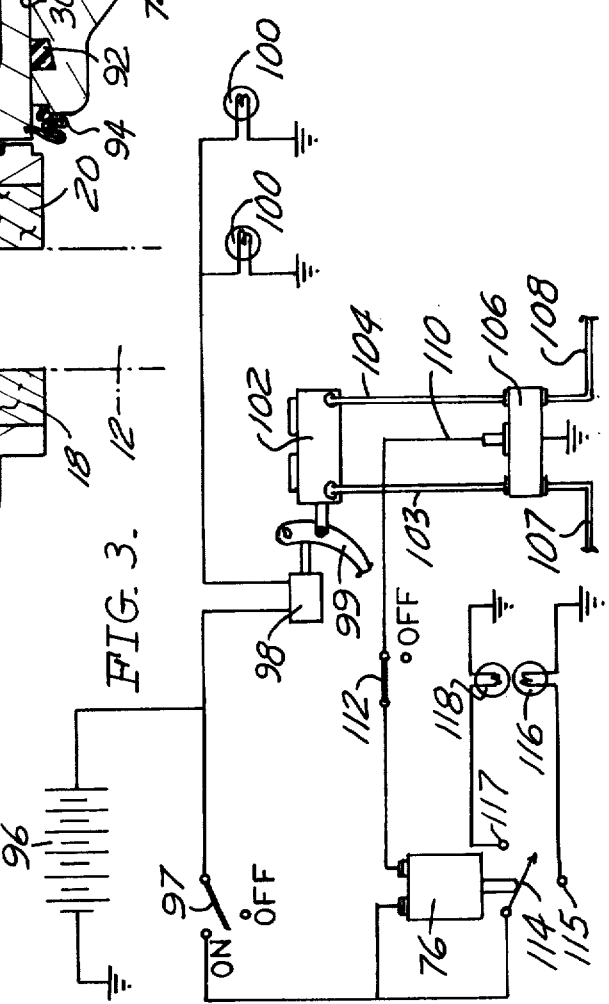
FIG. 3 is a schematic circuit diagram of the electrical circuit for actuating the solenoid of the locking detent.

Attention is directed first to FIGS. 1 to 3 of the drawings, wherein a disc brake embodying the principles of the invention is designated in its entirety by the reference numeral 10, and includes a rotatable annular disc 12 that is attached to the wheel of an automotive vehicle in the usual manner. Disc 12 has a pair of friction surfaces 14 and 16 on opposite sides thereof, and a pair of friction pads 18 and 20 disposed adjacent the friction faces 14 and 16, respectively, and are adapted to frictionally engage the latter when the brake is actuated. A caliper frame 22 is slidably mounted on a supporting structure in a manner well known to those skilled in the art, and includes an inwardly extending portion 24 which is disposed adjacent the friction pad 18, a bridge portion 26 which straddles the periphery of the disc 12, and a housing 28 defining two axially aligned cylinder bores 30 and 32, the latter being somewhat larger in diameter than the former.

Slidably disposed within cylinder bore 30 is a first, cup-shaped piston 34, having an end portion 36 bearing against the adjacent friction pad 20. A second piston 38 is slidably disposed within the other cylinder bore 32, and piston 38 has a central, axially extending, sleeve-like protuberance 40, projecting to the left (in FIG. 1) toward the bottom 36 of piston 34. The two pistons 34 and 38 face in opposite directions, and the skirt of piston 38 telescopes over the skirt of piston 34.

The protuberance 40 has a central bore that is threaded to receive the threaded stem 42 of an adjuster screw 44. The adjuster screw 44 has a large, disc-like head 46, having a tapered, conical face 48 on its outer peripheral edge. The face 48 seats against a corresponding conical seat 50 formed on the inside of the skirt of piston 34, and this provides a cone clutch which has an exceedingly powerful clutching action with respect to rotary motion of the adjuster screw head 46 with respect to the piston 34. Bearing against the back side of the head 46 is a clutch spring 52, the other end of which seats against one race of an anti-friction thrust bearing 54. The other race of the bearing 54 seats against a snap ring 56, which is seated in a groove formed in the skirt of the piston 34. The stem 42 has a power transmission screw thread 58, with a helix angle of about 15° (also known as Acme thread), which allows the axial thrust of the clutch spring 52 to cause the stem 42 to unscrew and extend with respect to piston 38 and protuberance 40. The manner in which this is accomplished will be explained presently.

Stacked on the side of piston 38, opposite piston 34, is a plurality of belleville springs 60, which combine to form a compression spring thrusting against piston 38. The end spring 60 at the right-hand end of the stack seats against an annular lid 62 having threads 64 that are screwed into corresponding threads in the end of cylinder 28. The lid 62 abuts at its outer end against a snap ring 66, seated within a groove in the caliper body 28, and the amount of pressure exerted by the springs 60 against piston 38 can be adjusted by inserting shims between snap ring 66 and annular lid 62. When the lid 62 is to be removed, snap ring 66 is sprung out of its seat, and the lid can then be unscrewed by means of a pin wrench inserted into pin wrench sockets 68. Lid 62 may also be manually backed out of the housing 28 to release the spring pressure on the brake pads if there should be a failure in the hydraulic system or in the O-rings 90, 92 or 133, in which case there would be no hydraulic pressure to force piston 38 back against the springs so as to compress them. Lid 62 has a central aperture 70, and inserted into the aperture is a dust cap 72.

Extending into the cylinder 32 through the bottom of the caliper body 28 is an oil inlet hole 74, into which tubing is connected that goes to the hydraulic master brake cylinder actuated by a brake pedal. On the top side of the body 28 is a solenoid 76, the purpose of which will be described presently. Solenoid 76 has a coil 78 and an armature 80, and is normally energized, whenever the vehicle is in operation, to draw the armature downwardly. Fixed to the bottom end of the armature 80 and projecting downwardly therefrom is a detent wedge plunger 82, which passes through a hole 83 in the body 28. A compression spring 84 bears upwardly against a radial flange 86 fixed to the top end of the armature 80, and this spring retracts the detent plunger 82 when the solenoid is de-energized and holds it in the retracted position shown in FIG. 1. When the solenoid is energized, armature 80 is pulled down into the coil 78, pushing the detent plunger 82 downwardly so that it seats within an annular groove, or cavity, 88 in piston 38 when the said groove is aligned with the plunger. FIG. 3 shows the detent seated in the groove 88, thereby locking the piston 38 so that it cannot be moved to the left by springs 60.

Groove 88 is offset to the left (in FIG. 1) by a distance such that when the groove is aligned with plunger 82, the belleville springs 60 are compressed to a predetermined pressure. The force exerted by the spring 60 is sufficient that, by itself, it applies the brakes to hold or stop the vehicle. As mentioned earlier, the spring pressure of the springs 60 can be increased, if desired, by screwing the lid 62 deeper into the caliper body, and inserting shims between the lid 62 and snap ring 66.

Surrounding the piston 38 and sealing the clearances between the piston and the cylinder walls 32, is an O-ring 90. Also surrounding the service piston 34 is a rectangular ring seal 92, which has the dual function of sealing the clearances between the piston 34 and cylinder walls 30, and also providing the piston-retracting means for moving the piston 34 back to the right a small amount, to release the brakes. When the brake is applied, piston 34 moves a very short distance to the left, distorting the rectangular ring seal 92 within its annular groove. When the brake is released, the elasticity of the rectangular ring seal 92 causes it to resume its original shape, pulling the piston 34 back to its initial position. However, if the brake pads 18, 20 have worn slightly, piston 34 will move to the left a distance greater than the distortion of the ring 92 permits, and therefore the piston slides through the ring seal 92 the extra small increment of distance required to take up the brake pad wear.

In the process of slipping through the rectangular seal 92, piston 34 moves away from the head 46 of adjuster screw 44. As this occurs, a clearance opens up between clutch faces 48, 50. Without the friction of the clutch face 48 against its seat 50, adjuster screw 44 is free to turn, and clutch spring 52 is therefore able to push the adjuster screw to the left, causing the power transmission thread 58 to unscrew until clutch face 48 again contacts its seat 50. At this point, the adjuster screw is prevented from turning any further, and extension of the adjuster screw is stopped.

The normal operating movement of piston 34 between its retracted position and the brakes-applied position, is a very small amount, and is just equal, or less than, the backlash of thread 58 in the bore of protuberance 40. To this end, the thread is made with approximately 0.04 inch – 0.05 inch (1 mm – 3 mm) clearance, or backlash, so that the piston 34 can move this distance without causing the adjuster screw 44 to turn. A flexible dust boot 94 between the end of piston 34 and the adjacent end surface of caliper housing 28 prevents dust from getting into the clearances between the piston 34 and its cylinder walls.

For normal operation of the brake, hydraulic fluid pressure is introduced into the cylinders 30, 32 through inlet 74, causing cylinder 34 to be urged to the left so as to apply the brakes, and simultaneously moving piston 38 to the right, thereby compressing springs 60 until groove 88 aligns with detent 82. At this point, the solenoid detent drops into the groove, thereby locking the piston 38 in that position, with the springs compressed. When brake fluid pressure is released, piston 34 is retracted by the elastic recovery of rectangular ring seal 92, as described earlier, but piston 38 remains in the locked position due to the fact that solenoid 76 is continuously energized, holding the locking detent 82 down into the groove 88.

When it is desired to operate the parking brake, solenoid 76 is de-energized, allowing spring 84 to retract detent plunger 82 from groove 88. This releases piston 38, and allows the compressed springs 60 to thrust the piston to the left, with adjuster screw 44 pushing piston 34 ahead of it so as to apply the brakes. Failure of the hydraulic pressure system also causes the solenoid to be de-energized, and this provides the failsafe feature of the invention.

The electrical circuit for energizing the solenoid 76 is illustrated in FIG. 3, to which attention is now drawn. Car battery 96 is connected in parallel to the ignition switch 97 and to the brake light switch 98. When switch 98 is closed by operation of the brake pedal 99, the stop lights 100 of the car are lighted up, in the usual manner. Brake pedal 99 actuates a tandem master cylinder 102 having lines 103 and 104 going to a pressure differential valve 106 having a normally-closed switch (not shown). Hydraulic fluid lines 107 and 108 go from the pressure differential valve 106 to pairs of brakes at opposite ends or opposite corners of the vehicle. If there is a failure in either of the lines 107, 108, the normally-closed switch within pressure differential valve 106 is opened, interrupting current through a wire 110 to a parking switch 112, which, in turn, is connected to solenoid 76 so that current is interrupted to the solenoid to de-energize the same. It will be noted in FIG. 3 that the normally-closed switch within pressure differential valve 106 completes the solenoid circuit to ground, and when the solenoid circuit is opened, the solenoid is de-energized.

Parking switch 112 is normally closed, and when the operator desires to apply the parking brakes while the ignition switch 97 is closed, parking switch 112 is manually opened by turning a key or other control device on the instrument panel, thereby opening the circuit to the solenoid 76 and de-energizing the same. Since the solenoid 76 is normally energized to hold the locking detent 82 down into the groove 88, de-energizing the solenoid cuases the detent plunger to be retracted by the spring 84, thereby releasing the piston 38 and allowing the belleville springs 60 to operate the brakes. Solenoid 76 also operates a switch 114 (see FIG. 3), closing the same with contact 115 to light up a green lamp 116 on the instrument panel when the solenoid is fully energized and detent plunger 82 is seated in groove 88. The lighted green lamp 116 indicates to the driver that the piston 38 is locked in retracted position. When the solenoid is de-energized, switch 114 is closed against contact 117, lighting up a red lamp 118 on the instrument panel to indicate that the parking brakes are applied. With the circuit illustrated in FIG. 3, the parking brake is automatically applied when the ignition switch 97 is switched off, as this interrupts the flow of current to the solenoid 76 and causes the solenoid to become de-energized. Any failure in the solenoid itself, such as a burned-out coil 78 or broken wire in the solenoid circuit, will likewise cause the brakes to be operated automatically by the springs 60, as this will also result in de-energization of the solenoid. It is also possible to connect the solenoid circuit in series with a brake pad wear warning circuit that is opened when the pads wear down to a predetermined minimum thickness, in which case the brakes will be applied.

When the vehicle is being operated, the brakes would normally be applied by hydraulic pressure admitted into the cylinders 30, 32 through the inlet hole 74. However, in case of an emergency, it is also possible to apply additional pressure to the brake by utilizing the spring pressure of springs 60, which would be done by switching the parking brake switch 112 to the open-circuit condition, thereby de-energizing the solenoid 76.

When it becomes necessary to replace worn brake pads 18, 20, the extended adjuster screw 44 can be retracted or screwed back into the protuberance 40 of piston 38 by means of a built-in tool 120. Tool 120 comprises a long cylindrical shaft 122 having a hexagonal head 124 at one end. Shaft 122 is slidably disposed within a cylindrical bore 126 in a plug 128 that is screwed into a boss 130 on the side of piston 38 opposite protuberance 40. An O-ring 132 surrounds the shaft 122 to seal the clearances at this point against loss of hydraulic fluid under pressure. The hex-head 124 of the tool 120 is adapted to be seated in a corresponding hexagonal socket 134 formed in the end of threaded stem 42, and this allows the shaft 122 to turn the stem 42 by using a screwdriver inserted through the slot in the end of shaft 122.

Another embodiment of the invention is illustrated in FIG. 4, to which attention is now directed. This embodiment is essentially similar to the preceding embodiment, and parts corresponding to those already described in connection with FIG. 1 are given the same reference numerals with the prime suffix (') added. In this embodiment, the two cylinders 30', 32' are separated by a partition wall 136, having a central cylindrical bore 138, through which the protuberance 40' passes in sliding engagement. The two cylinders 30', 32' are thus completely separate from one another, and the two cylinders are supplied by hydraulic fluid pressure through separate oil inlets 140 and 141, the former being connected to the master brake cylinder operated by the regular service brake pedal, and the latter being connected to a hand-operated valve control, of the type commonly used on large trucks. Another difference that will be noted is that the anti-friction thrust bearing 54' is located between the clutch spring 52' and head 46' of the adjuster screw 44'. Otherwise, the construction and operation of the piston 34' and adjuster screw 44' is exactly the same as in the preceding embodiment.

In addition to the solenoid 76' at the top of the caliper body 28', which functions as a parking brake, there is also a second solenoid 176 at the bottom of the body 28'. Solenoid 176 is offset slightly to the right of solenoid 76' so that there is a greater distance between detent pawl 180 and its socket 178 in piston 38', which requires that the piston move a slightly greater distance to the right before it is locked than is the case with solenoid 76'. The purpose of this is to enable the operator to compress the springs 60' an additional increment so that when the piston 38' is released, the springs will exert a more powerful thrust against the piston, causing the brakes to be applied harder than would be the case when detent 82' of solenoid 76' is used. To compress the springs 60' additionally, solenoid 76' is de-energized to retract its detent plunger 82' at the same time that hydraulic fluid is admitted to cylinder 32' through inlet 141. The hydraulic pressure acting against piston 38' moves the latter further to the right, compressing springs 60' until detent pawl 180 drops into its socket 178. As the piston 38' moves to the right, clearance opens up between the clutch facings 48', 50' to adjuster screw 44', allowing the adjuster screw to rotate freely so that the clutch spring 52' is able to unscrew the adjuster along its screw thread 58'. When the clutch facings 48', 50' make contact again, the unscrewing action of adjuster screw 44' stops. Now, when the springs 60' are used to operate the brakes, there is a greater spring pressure acting against piston 38', owing to the greater amount that the springs are compressed. Solenoid 176 is de-energized by a separate switch (not shown). A screw 182 passes through the wall of cylinder 32', and its inner end is slidably engaged in a slot 184 in piston 38'. Slot 184 extends parallel to the axis of the piston, so that the latter is prevented by the screw from turning within its cylinder. One situation where it is advantageous to be able to compress the springs 60' an additional amount so as to get a more powerful spring operation of the brakes, is in the case of trucks which require application of the brakes over an extended period of time, as when going down a long downhill grade. In such a case, the brakes can be spring-operated, using the lesser spring compression initially, obtained with solenoid 76'. Then, as the grade becomes steeper and a more powerful braking action is required, the driver operates the necessary switches and valves to move piston 38' to the right until it is locked by solenoid 176, after which solenoid 176 is de-energized to operate the brakes again with the more highly compressed springs.

While we have shown and described in considerable detail what we believe to be the preferred forms of our invention, it will be understood by those skilled in the art that the invention is not limited by such details, but might take various other forms within the scope of the following claims.

What we claim is:

1. A power parking, failsafe disc brake for an automotive vehicle comprising, in combination:

a rotatable disc having friction faces on opposite sides thereof, a pair of friction pads engaging respective friction faces, and a caliper housing operably connected to each of said friction pads for urging the same into braking engagement with said disc when the brake is actuated, said caliper housing having a pair of axially aligned cylinder bores provided therein;

a first piston slidably disposed within one of said cylinder bores and having an end portion bearing against the adjacent friction pad;

a second piston slidably disposed within the other cylinder bore;

clearance adjusting means having a screw thread connection to said second piston and a frictional clutch connection with said first piston, and including a spring acting to extend said adjusting means;

compression spring means bearing against one side of said second piston in the direction to apply the brakes;

means for introducing fluid pressure into said cylinders, said first piston being actuated by said fluid pressure to operate the brakes for normal service operation and said second piston being urged by fluid pressure in the direction to compress said spring means;

a solenoid-operated locking detent that seats in a cavity in said second piston, the solenoid having a coil that is continuously energized while the system is in normal operation, thereby holding the locking detent down into engagement with said second piston; and said solenoid having its coil connected to a normally closed switch that is opened whenever a failure occurs in the normal service hydraulic brake system, whereby the solenoid is de-energized to release said second piston and allow said compression spring means to apply the brakes automatically responsive to failure of the service brakes.

2. A power parking, failsafe disc brake as in claim 1, wherein manually controlled switch means is provided to open the circuit to the solenoid so as to de-energize the same when it is desired to operate the brakes by said compression spring means.

3. A power parking, failsafe disc brake as in claim 1, which further includes means for varying the spring force exerted by said compression spring means.

4. A power parking, failsafe disc brake as in claim 3, wherein said means for varying the spring force of said compression spring means includes a second solenoid-operated locking detent, said second locking detent being operable to lock said second piston in place when the latter has compressed the spring means by an amount greater than the compression obtained with the first-named locking detent, said second piston being released by the first-named locking detent and moved by hydraulic pressure until engaged by said second locking detent, and said adjusting means being operable to take up the clearances between said clutch facings as said second piston moves away from said first piston.

5. A power parking, failsafe disc brake as in claim 1, wherein there is a second solenoid-operated locking detent disposed on the opposite side of said second piston from the first-named locking detent, both of said locking detents being operable to seat in a circumferential groove formed in the side wall of the second piston.

6. A power parking, failsafe disc brake as in claim 1, which further includes a tool having an elongated cylindrical shaft that passes through and is slidable with respect to the end of said second piston, said tool having a non-round formation on its inner end that seats within a correspondingly non-round socket in the end of said clearance adjusting means, and the outer end of said tool being accessible for turning by the operator so as to turn the clearance adjusting means in the direction to retract the same.

7. A power parking, failsafe disc brake as in claim 1, wherein said compression spring means is backed up against a disc that is screw-threaded within the outer end of said other cylinder bore, said disc being adjustable by virtue of said screw threads to increase or decrease the amount that said spring means is compressed, and means for locking said disc in adjusted position.

* * * * *